United States Patent [19]

Templin

[11] Patent Number: 4,472,969
[45] Date of Patent: Sep. 25, 1984

[54] MEASURING INSTRUMENT

[76] Inventor: Manfred Templin, Feldhausweg 10, 4006 Erkrath 1, Fed. Rep. of Germany

[21] Appl. No.: 391,497

[22] Filed: Jun. 24, 1982

[30] Foreign Application Priority Data

Jun. 25, 1981 [DE] Fed. Rep. of Germany ....... 3124875

[51] Int. Cl.$^3$ .............................................. G01F 23/06
[52] U.S. Cl. ...................................... 73/313; 73/292; 338/33
[58] Field of Search ...................... 73/292, 304 R, 305, 73/311, 306, 290 R, 313, 308; 364/509, 442; 338/33; 340/623

[56] References Cited

U.S. PATENT DOCUMENTS 3,200,645  8/1965  Levins .................................... 73/313
4,386,406  5/1983  Igarashi et al. ........................ 73/313

FOREIGN PATENT DOCUMENTS 2944076  5/1981  Fed. Rep. of Germany ........ 73/292

Primary Examiner—Gerald Goldberg
Assistant Examiner—Hezron E. Williams
Attorney, Agent, or Firm—Peter K. Kontler

[57] ABSTRACT

A test probe for monitoring the level of liquid in a storage container, especially of a flammable liquid, has a guide tube which is inserted through and secured in the threaded hole of a cover of the container. The probe is provided with a magnetic indicating system mounted in part on a bearing which surrounds the tube within the container. Magnetically coupled to the bearing and movable along and within the tube is an electrical contact carriage which makes contact with fingers provided on rolled-on metal tracks provided on non-conductive profiled strips located at least in part in the tube. The strips are reinforced by profiled rails which are located in the tube.

33 Claims, 18 Drawing Figures

MEASURING INSTRUMENT

BACKGROUND OF THE INVENTION

The present invention relates to a testing or measuring instrument.

More particularly, it relates to a test or measuring probe for monitoring the level of liquid in storage containers.

Still more specifically, the invention herein relates to a test probe for storage containers of the type adapted to hold flammable liquids.

Test probes of this general type are known from German published Application DE-OS No. 2,944,076. The probe disclosed in that application is intended to continuously monitor the level of liquid in a container, for which purpose it utilizes a resistance wire that is stretched in U-shaped configuration over the test path and produces a resistance value proportional to the liquid level in the container, via a short-circuiting element, such as a slider.

The known probe is generally capable of fulfilling its basic intended purpose. However, it is possessed of certain drawbacks. For example, over time the accuracy and stability of the measured values are not adequate to meet the requirements made in modern applications. One important reason for this resides in the use of the resistance wire itself, since the wire may tear or elongate and, in either event, will then make electrical contact with the guide tube which will result in predictable difficulties. Furthermore, a resistance wire as used in the prior art has no means of temperature compensation nor any facility for monitoring the wire and/or its performance. The small contact forces exerted by the tactile elements of the device may result in time-dependent contact and transition resistances whose development then leads to erroneous measuring results. Given these factors it has been found that the prior art system does not meet certain governmental specifications, such as for example that promulgated in the Federal Republic of Germany in the Calibration Standard for "Measuring Devices for the Volume Measurement of Liquids".

Another prior art drawback is that the resistance wire is stretched, i.e. mechanically stressed. Such a wire can be used only with guide tubes having a maximum length of 3 meters; beyond this, safety considerations preclude the use of these wires. Also, it is not possible in the prior art to employ electrical balancing in order to match the resistance wire to the nominal container filling line, which is another self-evident drawback.

The prior art probe is kept afloat in the container by foldable floats which, to reduce their weight, are hollow and thin-walled. Over time this construction results, however, in a weight-increase of the probe, due to diffusion of the liquid container contents into the floats. Added to this is the likelihood—usually unavoidable—that the device will encounter significant buoyancy resistance (e.g. due to the presence of particulate contaminants in the liquid, or the presence of solder or weld seams or spots in the longitudinal direction of the guide tube) which may cause the floats to be snagged or otherwise to be kept from rising and descending with the liquid level; it goes without saying that this will result in erroneous measurements. There being insufficient buoyancy, it is clear that the prior art is not suitable for use in connection with liquid media having a low specific gravity, such as for example supertype gasoline. It is, of course, also very definitely not usable in pressurized containers since the floats are too fragile to withstand container pressurization.

And finally, the prior art is suitable only for applications in which the cover of the container has—and for structural and other reasons can have—an opening with an inner diameter of two inches or more. The device must not be allowed to touch the surrounding elements, so that the opening cannot be made any smaller for use with the existing device. On the other hand, however, it is not feasible to make both the opening and the device itself any smaller, since this would require a reduction in the size of the floats and would further impair their already inadequate buoyancy.

OBJECTS AND SUMMARY OF THE INVENTION

Accordingly, it is a general object of the present invention to overcome the disadvantages of the prior art.

A more particular object of the invention is to provide an improved test or measuring instrument of the type under discussion, which avoids the aforementioned prior-art disadvantages.

A still more specific object of the invention is to provide an improved test probe which is suitable for use with all types of containers and media, including and especially flammable media, while avoiding the prior-art disadvantages.

A concomitant object of the invention is to provide a test probe of the kind here under discussion, which meets the above requirements and, in addition, meets applicable governmental specifications such as those laid down in the Federal Republic of Germany Calibration Standard for "Measuring Devices for the Volume Measurement of Liquids".

Still another object of the invention is to provide a test probe of the kind in question, which is relatively simple in its construction, very reliable in operation and not prone to malfunction.

Yet a further object is to provide such a test probe which is comparatively inexpensive to construct and easy to maintain.

In pursuance of these objects, and of still others which will become apparent hereinafter as the description proceeds, one aspect of the invention resides in the provision of a test probe for monitoring the level of a liquid in a container. The probe has a guide tube connectable to an opening in the container cover. A float is inserted through the opening and a set of electrical contact members forming electrical resistance paths, is arranged within the tube. According to the invention, these members constitute integrated parts of electrically non-conductive profiled strips which extend over the entire length of the measuring path and are provided on their lateral faces with guides for the guidance of a contact-making carriage of the float.

According to the aforementioned concept of the invention, the contact members forming the electrical resistance paths are now a integrated —i.e. a direct—parts of the profiled strips which, in turn, are push-fitted onto a pair of parallel rails which extend axially within the guide tube. One of the particular advantages of this arrangement is that the contact members are now firmly held on a stable base, thereby assuring that the nominal resistance value per meter/length of the contact members will not be able to vary; that is to say that the invention avoids the heretofore unavoidable prior art problems which were caused by the mechanical stressing of the resistance wire and often resulted in wire elongation and concomitant erroneous measurements.

Moreover, the electrical characteristics of the contact members can already be predetermined at the time of their manufacture, e.g. by treatment of the members with electron beams or with laser rays. This can be done in such a manner that the members will exhibit either a linear function (also known as "level-linear") or a volume-related function (also known as "volumne-linear") in dependence upon the container liquid level and in accordance with the nominal container fill line. What this means is that in conjunction with e.g. an association table of a measured-content standardized container type, it is now possible to obtain measurements which are so accurate—in fact, which are completely reproducible—as to permit calibration of the probe in accordance with applicable standards. The units being measured by the probe in the container may be liters, points, or parts, given the fact that a level difference of ±1 mm at the center of a normal container holding 20,000 liters corresponds to a volumetric difference of about ±20 liters.

Another advantage of the invention is that the probe output can be linked with a software calculator program. Such a program may, inter alia, take into account if and when the container is mounted in (or has moved to) an inclined position, this program determination can be made in addition to information derived from inclinometers installed in the head of the probe itself. For example, if the contact members have already been prepared at the time of manufacture for a volume-related function in conjunction with the particular container type to be monitored, it is a simple matter to connect the probe output to a display, printer or other read-out which allows the user to directly read the container contents in liters, points or parts; or else a simplified calculator program may be utilized which mathematically indicates the liquid volume respectively the liquid mass in the container at any given time.

It is important, as will have become apparent from preceding comments, that the contact carriage of the device be guided for proper parallel movement. The invention assures this for the first time ever, due to the integration of the contact members with the profiled guide strips which are in turn held and reinforced by the guide rails. The mechanical strength and rigidity of the device is high and the measured values are precisely reproducable. The system can be readily electrically matched and is capable of the calibration re-required to meet governmental standards, such as that mentioned for the Federal Republic of Germany. Variations in the liquid level, e.g. filling beyond the nominal container fill line, are readily ascertainable.

The novel features which are considered to be characteristic of the invention are set forth in particular in the hereto appended claims. The improved device itself, however, together with details of its construction and the best mode of operation currently known to applicant, as well as additional features and advantages of the invention, will be best understood upon a perusal of the following detailed description of specific although purely exemplary embodiments with reference to the accompanying drawing.

DESCRIPTION OF PREFERRED EMBODIMENTS

Figure 1:
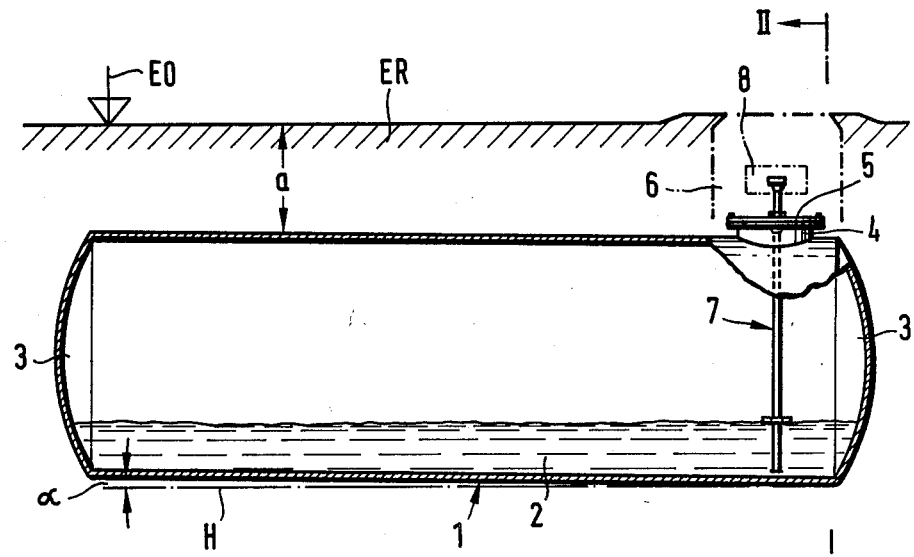
FIG. 1 is a diagrammmatic vertical longitudinal section through an underground container with which the invention probe is usable.
Figure 2:
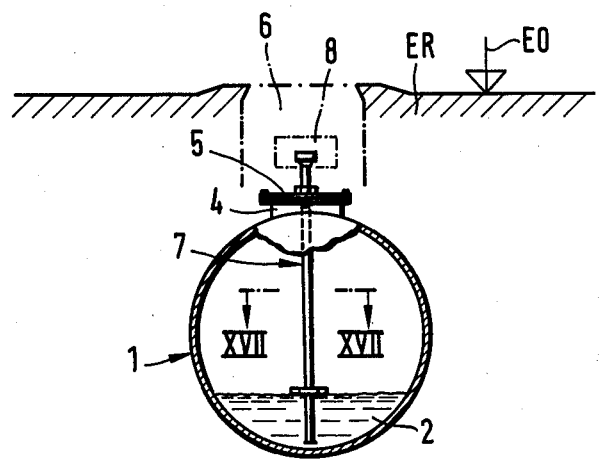
FIG. 2 is a diagrammatic section of the container in FIG. 1, taken on line II—II thereof.
Figure 3:
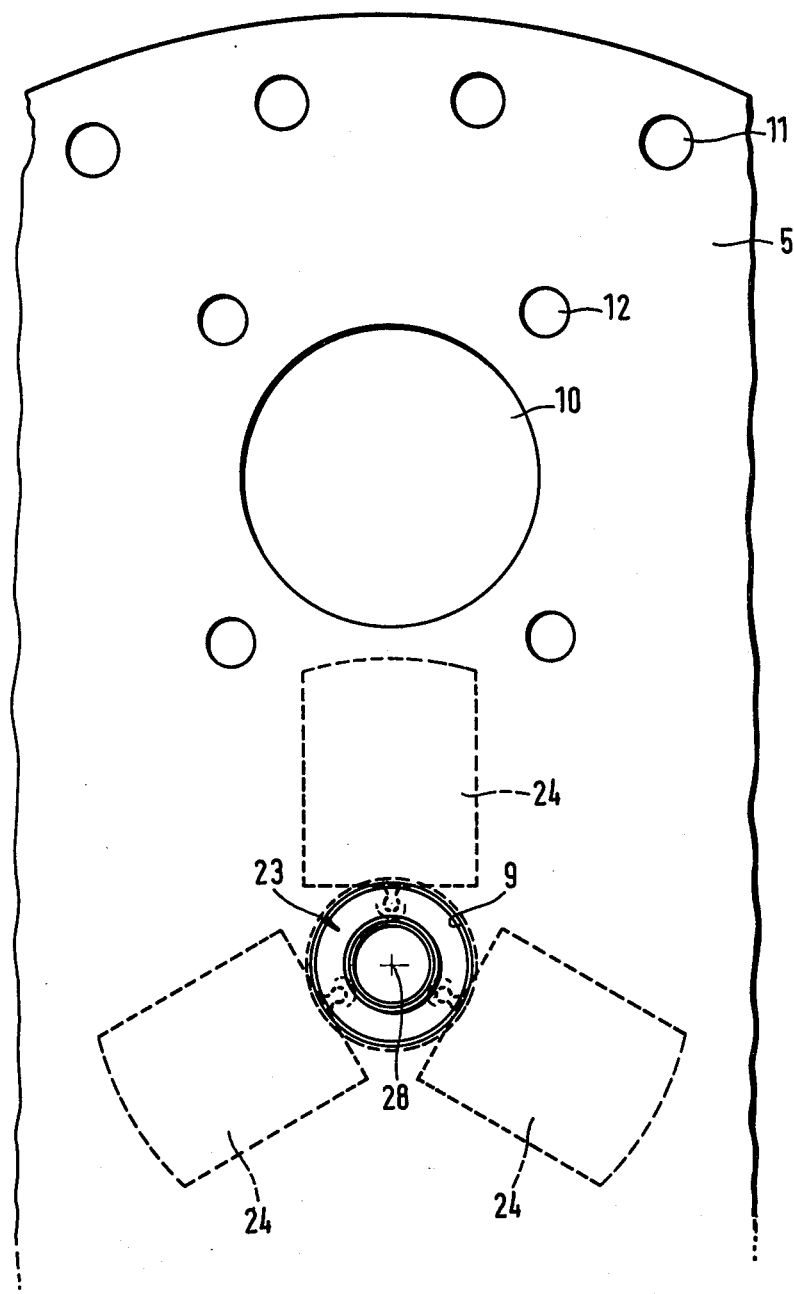
FIG. 3 is a fragmentary enlarged-scale view, showing part of the domed cover of the container in FIGS. 1 and 2.

Before proceeding to details of the inventive probe itself, a discussion will be helpful of the kind of container with which the probe is adapted to be used. FIGS. 1-3 illustrate such a container, designated with reference numeral 1; the one shown is intended to hold fuel (such as gasoline) 2 and is of the type intended to be buried below ground level EO at a distance a, for example at a gasoline station.

The container itself is of generally cylindrical configuration and for stability has opposite part-spherical ends 3. At one end portion it is also provided with a riser or dome 4, the upper end of which is closed by a cover 5. Given the fact that the container is buried in the ground, an access hole 6 (shown in broken lines) is provided through which the dome 5 can be reached. In the illustrated instance the container 1 is mounted not strictly horizontally but is, instead, mounted at an angle of about 0.5° to 1° relative to the horizontal plane H.

The purpose of the dome cover 5 is two-fold: it serves, of course, to close off the interior of the container against entrance of contaminants. More importantly, however, in terms of the present invention, the cover 5 mounts the inventive test probe 7 whose purpose it is to monitor the level of liquid 2 in the container 1, as well as the temperature of such liquid.

In addition, the probe according to the invention is so constructed as to monitor and report flooding of the dome access hole 6 by water and/or fuel (i.e. broadly speaking, liquid of the type in the container). The upper end of the probe 7 carries a connecting head 8 provided with contact terminals, which may be provided with not specifically illustrated (because known per se) indicators and operating armatures. This head may also be provided with a remote transmitter which passes on the measured data as control commands to a central location where they trigger requisite action.

FIG. 3 shows on an enlarged scale that the dome cover 5 has a tapped central bore or opening 9; this serves to secure the probe 7 in the cover. In addition, the cover 5 has another opening 10 which is located radially outwardly with reference to the opening 9; this opening 10 is intended to allow filling of the container with the liquid 2 via a filler tube or hose. Reference numerals 11 identify the locations (generally holes) at which the cover 5 is mounted on the container 1, or more specifically on the dome 4 of the container. Similarly, reference numerals 12 designate the mounting locations for filling-tube flange (not shown) surrounding the filling opening 10 through which the liquid 2 is admitted into the container.

Figure 4:
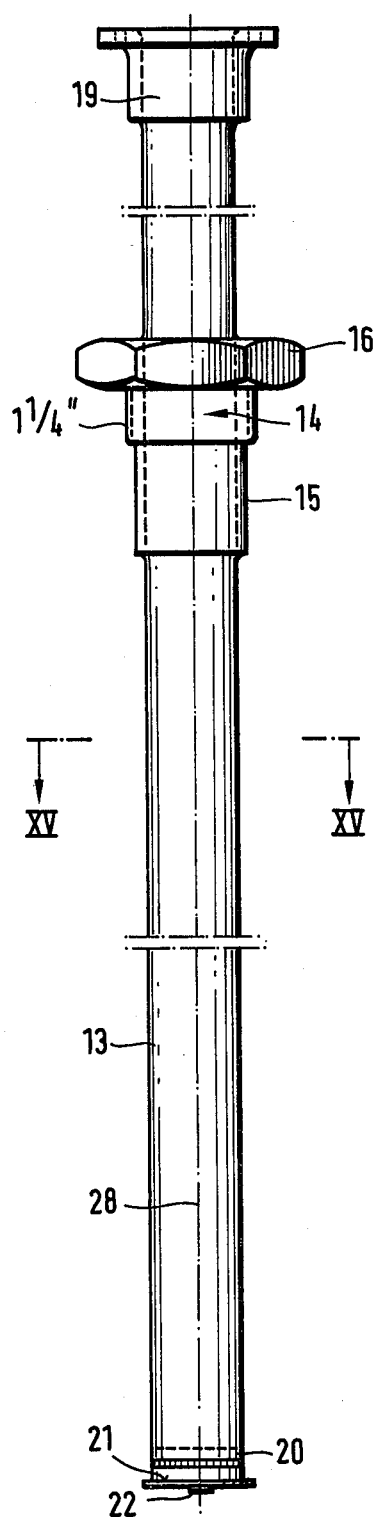
FIG. 4 is an elevational view, showing a guide tube of an embodiment of the inventive probe.

With this preliminary information established relative to the container 1, the description can now proceed to the details of the inventive probe 7. As shown in FIG. 4, the probe 7 has a tubular guide 13 which is preferably made of steel, for example of the non-magnetic type 1.4571 specified in the German Industrial Norms DIN. The guide 13 (hereinafter called tube) has a threaded connector 14 pushed upon its upper end portion, where it is also secured against movement relative to the tube 13; this connector serves to secure the tube 13 in the threaded opening 9 of the cover 5. Connector 14 is provided with an extension or tail piece 15 of cylindrical shape; this piece has a guide function and is long enough to be in firm contact with the outer surface of the tube 13. Located beyond the piece 15 is a hexagonal piece 16 (the latter being preferably provided with a hexagonal nut-profile for easier engagement with a tool, such as a wrench); in between the two is provided a section having an external thread of e.g. 1¼". The piece 16 is to be threaded into the tapped opening 9, so as to secure the tube 13 in the cover 5.

It goes without saying that not all dome covers have an opening 9 which is dimensioned to accept an outer-diameter thread of 1¼" diameter. To make the probe adaptable to other conventionally used dimensions and threads, the box nuts 17 and 18 are provided which are shown in FIGS. 6 and 7, respectively. The nut 17 shown in FIG. 6 has an inner thread of 1¼" so that it can be matingly threaded onto the same diameter outer thread of the connector 14 (FIG. 5) and an outer thread of 1½" diameter which allows it to be threaded into an opening 9 having a correspondingly dimensioned inner thread. Similarly, the nut 18 shown in FIG. 7 has an inner thread of 1¼" diameter to mate with the outer thread of the connector 14, and an outer thread of 2" diameter to mate with a corresponding inner thread of an opening 9 having an inner diameter of two inches. The nuts 17 and 18 are preferably hexagonal to facilitate gripping with a tool. The upper end of the tube 13 is provided with a collar 19, which may be integrally formed with it but is here shown as being threaded to it; its purpose is to mount the connecting head 8 mentioned before and diagrammatically shown in FIGS. 1 and 2. The lower end of tube 13 carries a plug 20 as well as baffle plate 21. For ease of mounting of the probe, the baffle plate 21 may have a weakened zone or line along which it can be readily broken. A screw 22 is provided to hold the plate 21 in place while needed.

Figure 8:
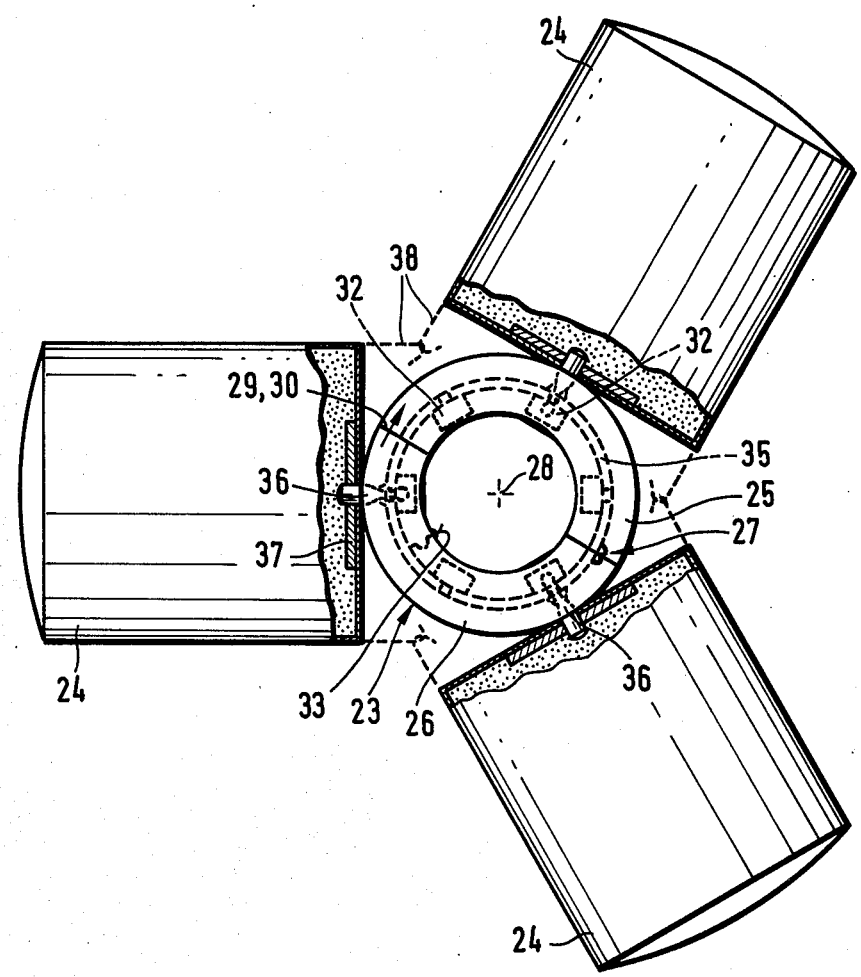
FIG. 8 is a top plan view of a system of floats of the novel probe.
Figure 9:
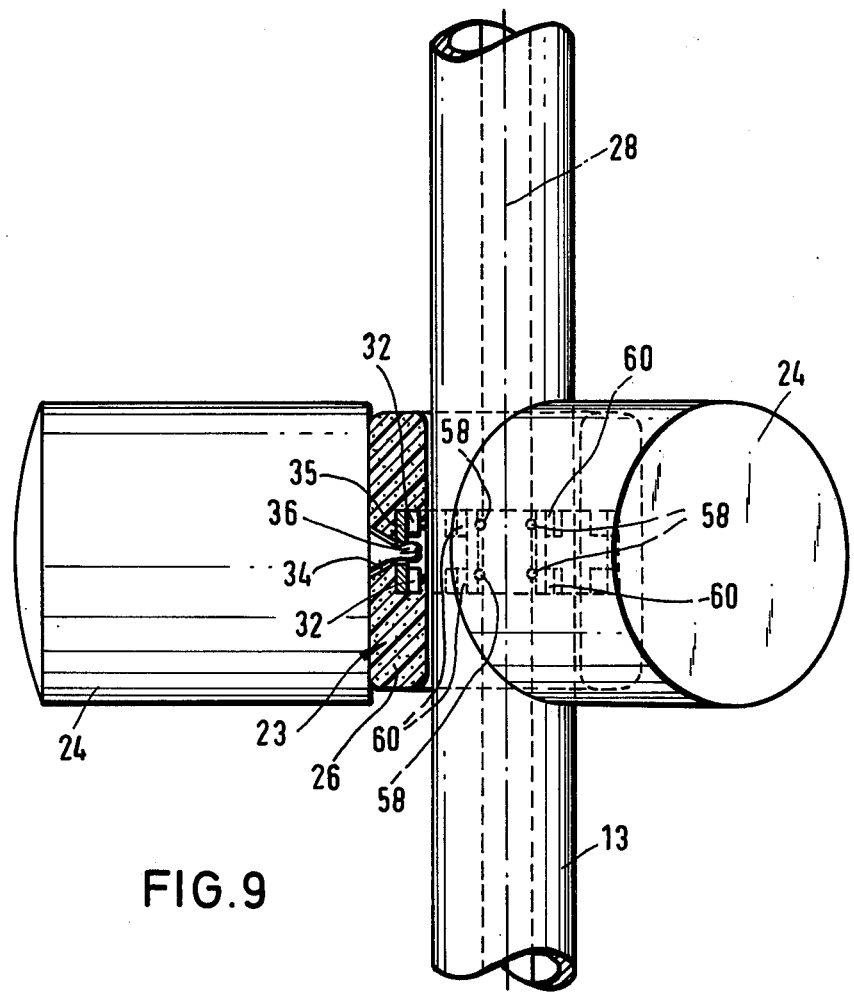
FIG. 9 is a partially sectional side elevational view of the float system in FIG. 8.
Figure 10:
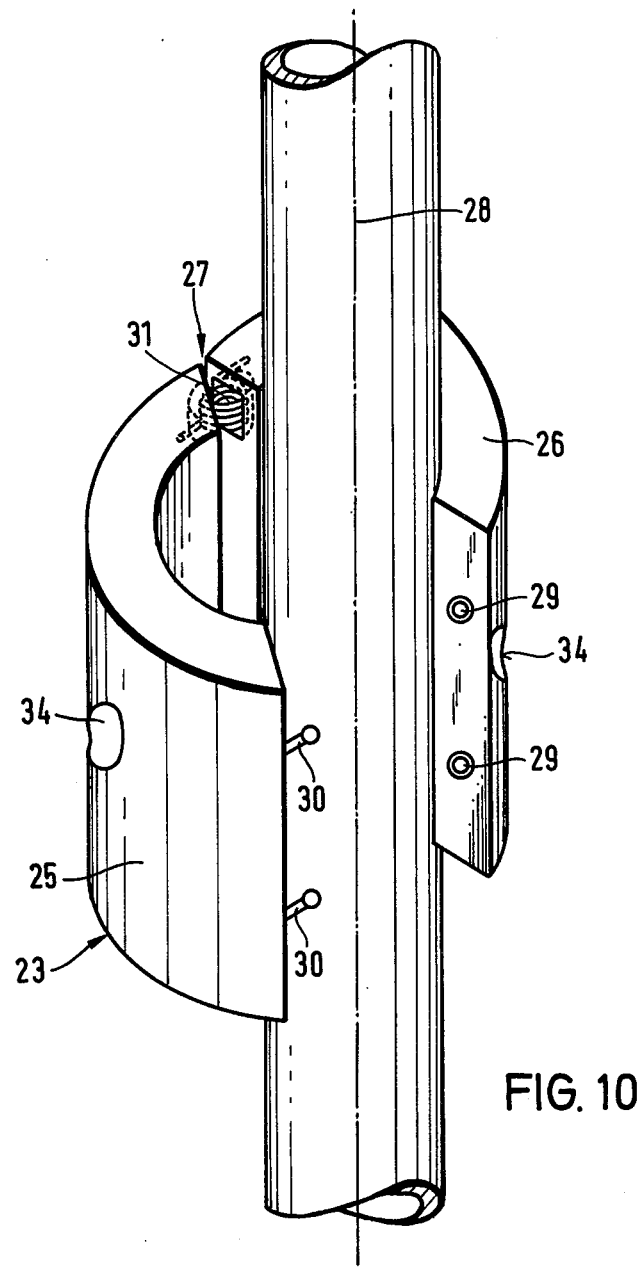
FIG. 10 is a perspective view, illustrating a slide bearing of the float system shown in FIGS. 8 and 9.

FIGS. 8 to 10 illustrate a float system which is instrumental in determining the level of liquid 2 in the container 1. Basically (see FIG. 3 along with FIGS. 8-10) the float system utilizes a bipartite slide bearing 23 and floats 24 which are securable to the bearing 23.

As FIG. 8 shows very clearly, the slide bearing 23 has two parts 25 and 26 which are articulated at 27 and thus are turnable about an axis (no number) which extends parallel to the longitudinal axis 28 of the guide tube 13. At its side which is diametrally opposite to the articulation 27, the bearing 23 is provided in the part 26 with recesses 29 and in the part 25 with retaining bolts 30. This construction makes it possible to insert the bearing 23 into the container 1 through the cover opening 9, to place it in open condition (i.e. hinged open about the articulation 27) about the tube 13, and finally to secure it on the tube 13 by forcing the bolts 30 into their associated recesses 29. One or more springs 31 (one shown in FIG. 10), preferably but not necessarily of the spiral type, maintain closing pressure on the bolts 30 to keep them lodged in the recesses 29.

The parts 25, 26 of the slide bearing 23 are preferably—although again not necessarily—made of a pressure-resistant synthetic plastic material filled with a hard (pressure-resistant) synthetic plastic foam material. Approximately at mid-height the bearing 23, or more specifically the parts 25, 26 of the same, have imbedded in them an outer magnet system which (see FIGS. 8 and 9) is composed of twelve magnetic bodies 32. These are located at two levels (as is best seen in FIG. 9) and are offset relative to one another through 60°. A contact spring 33 establishes contact with the tube 13 and is galvanically connected with the system of magnetic bodies 32.

The floats 24 may have various desired shapes, although a cylindrical shape is currently preferred for them. They are secured to the slide bearing 23 by a simple push-type connection and, for this purpose, the parts 25, 26 of the bearing 23 are provided approximately at mid-level height with three radial recesses which are circumferentially offset relative to one another through 120° angles; these recesses, identified with reference numeral 34, taper inwardly in funnel-shaped configuration as shown in FIGS. 8-10. However, it should be noted from FIG. 9 that beyond the illustrated embedded ferrous (or otherwise conductive) contact members 35, the recesses 34 increase again in their inner dimension. This permits clips 36 which are secured to the free ends of the floats 24, to be inserted into the recesses 34 and the free ends of these flips then to be spread apart (compare FIG. 9) beyond the narrowest portion of the respective recess 34, thereby fastening the floats 24 in radially projecting relationship to the parts 25, 26 of the bearing 23. As FIG. 8 shows most clearly, the clips 36 themselves are fastened to the floats 24 by means of plates 37 which, advantageously, are simply embedded in the material of the floats as the floats are produced by injection or other molding. FIG. 8, incidentally, also shows that any two circumferentially adjacent ones of the floats 24 may be connected by thin, hook-like links 38 whose two elements (one on each of the two thus-connected floats) can freely move relative to one another. The other ends of these links 38, i.e. the ones which do not engage one another, may be welded to the respective floats 24.

The embodiment in FIGS. 8-10 shows a slide bearing 23 which can be folded open, due to being hinged or articulated at 27. Two other slide bearing embodiments—both suitable for use with all embodiments of the probe disclosed herein—are illustrated in FIGS. 11 to 14. However, these two embodiments do not have the hinge feature of the one in FIGS. 8-10.

In particular, the two bearings in FIGS. 11-14 which can be discussed jointly for purposes of this explanation, are identified with reference numerals 39 and 40, respectively. They are formed in both instances of short tubular sections 41 and 42, respectively.

Figures 11, 13:
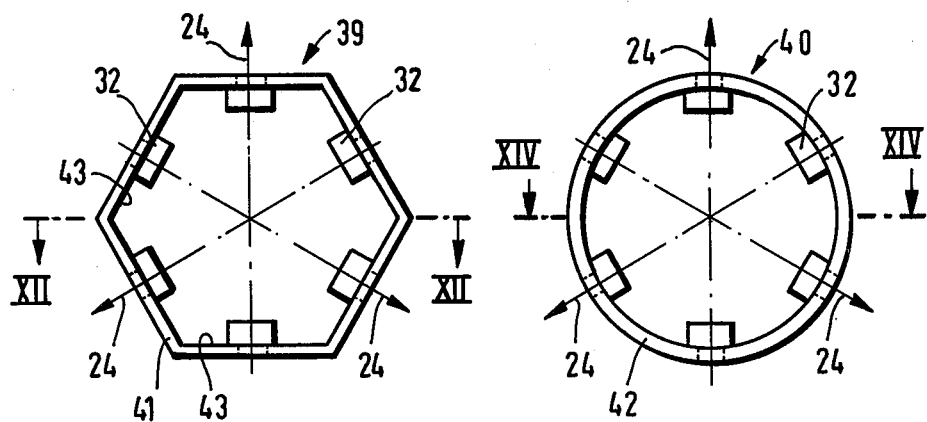
FIG. 11 is a top plan view, showing an embodiment of an outer magnet system for the inventive probe.
FIG. 13 is a view analogous to that of FIG. 11, but illustrating a different embodiment of an outer magnet system for the probe.
Figures 12, 14:
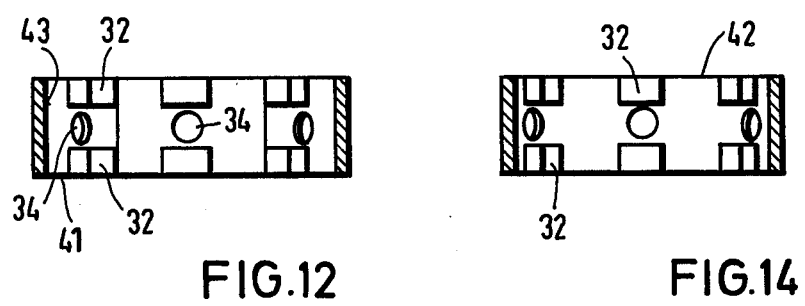
FIG. 12 is a vertical section on line XII—XII through FIG. 11.
FIG. 14 is a vertical section on line XIV—XIV of FIG. 13.

In the embodiment of FIGS. 11-12 the tubular section 41 is of hexagonal cross-section; this allows for the magnetic bodies or elements 32 (compare FIGS. 8-10) to be readily mounted on the flat inner surfaces 43 of the section 41, again at two height levels as mentioned before; no special working or shaping of the bodies 32 and/or the inner surfaces of the section 41 is required. The openings 34 for the clips 36 of the respective floats (here identified by arrows) are provided at a level between the two levels on which the magnetic bodies 32 are mounted.

The embodiment of FIGS. 13 and 14 differs from the one in FIGS. 11-12 essentially only in that the tubular section is of circular cross-section. The magnetic bodies 32 are again arranged on two different height levels. However, since here there are no flat inner surfaces on the section 42, the surfaces of the bodies 32 which face the inner side of the section 42 must be worked (e.g. ground or otherwise shaped) in order to conform them to the contour of the inner surface of the section 42, so that they can be secured to this inner surface.

Figure 15:
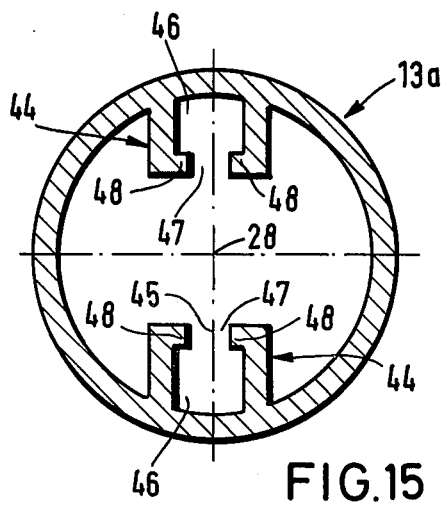
FIG. 15 is a horizontal sectional view of the guide tube in FIG. 4, taken on line XV—XV of that Figure.
Figure 16:
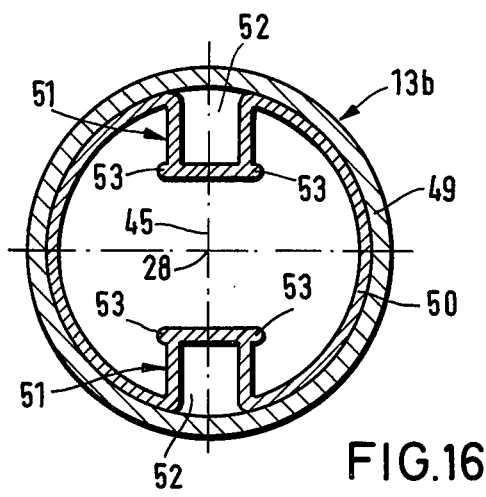
FIG. 16 is a view similar to that of FIG. 15, but showing a different embodiment of the guide tube.

Two embodiments of guide tubes 13a and 13b are shown in FIGS. 15 and 16, respectively. These are alternatives to the tube shown in the preceding embodiments and can be used with any probe disclosed herein.

The guide tube 13a shown in FIG. 15 has internal guide rails 44 which preferably are formed of one piece with the tube 13a and, being located diametrally opposite one another, extend parallel to the longitudinal axis of the tube 13a and are equi-distantly spaced from the central longitudinal plane 45 of the tube. There are two pairs of such rails 44 and each pair forms a guide channel 46 which extends lengthwise of the tube 13a and is of about quadratic cross-section (although other cross-sectional configurations are certainly possible). The inwardly directed side of each of these channels 46 is open towards the central longitudinal axis 28 of the tube 13a, via a slot 47 which is laterally bounded by clamping ribs 48 whose purpose will be described later in conjunction with FIG. 17. The embodiment of FIG. 16 differs from that of FIG. 15 essentially in that it, in effect, uses two telescoped-together tubes which jointly make up the basic tube 13b. The outer of the two tubes is identified with reference numeral 49; it is relatively thick-walled and has smooth outer and inner surfaces. Mounted in this outer tube 49 is an inner tube 50 which is shaped to have the equivalent of the rails shown in FIG. 15—but in FIG. 16 identified with the reference numeral 51—which are again located diametrically opposite one another and of which the rails of each pair are located equi-distantly at opposite sides of the central longitudinal plane 45 of the tube 13b. Each pair of the rails 51 also forms a channel 52 which is parallel to the longitudinal axis 28 of the tube 13b; however, these channels are closed rather than open towards this axis 28. These rails, also, are provided with clamping ribs 53 except that these, unlike the ribs 48 of FIG. 15, face outwardly away from one another.

Figure 17:
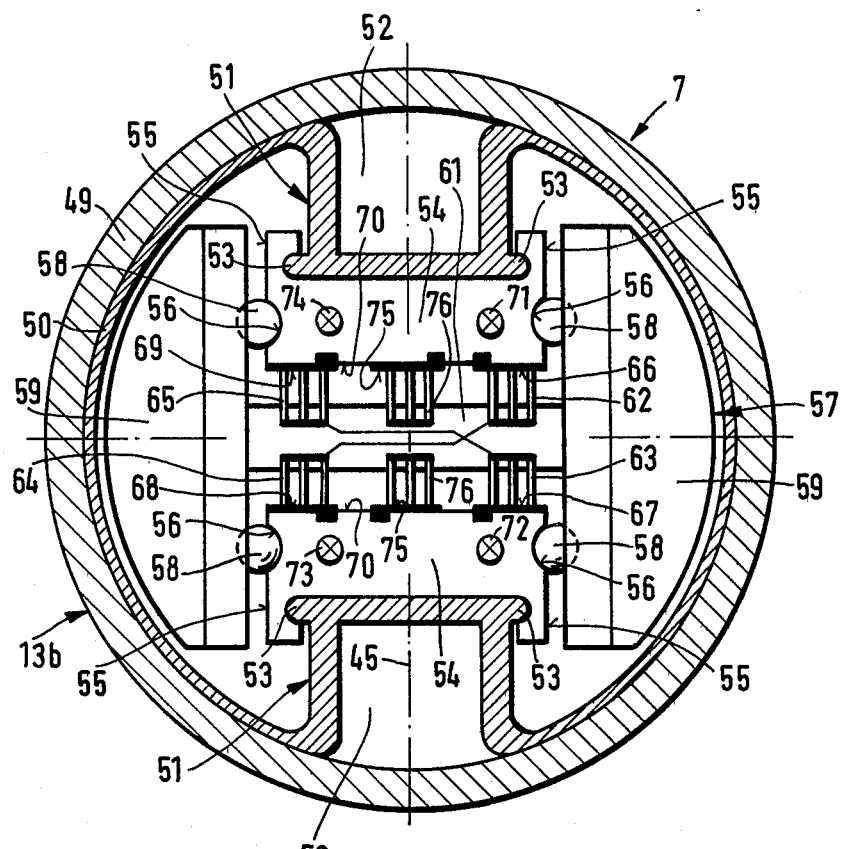
FIG. 17 is an enlarged cross-sectional view through a complete probe according to the invention, the section being taken on line XVII—XVII of FIG. 2.

Referring now to the embodiment of a complete probe which is shown in FIG. 17, it should first be pointed out that the rails 44 of FIG. 15 and 51 of FIG. 16 serve to mount the profiled strips 54 shown in FIG. 17 and that the guide tube 13b illustrated in conjunction with the FIG. 17 embodiment corresponds to the tube 13b in FIG. 16.

With this in mind, it should also be understood that the profiled strips may be produced in various ways; for example, they may be drawn or extruded and they have—as shown—a U-shaped or approximately U-shaped cross-section. In this embodiment the outwardly extending ribs 53 of the rails 51 are exteriorly embraced (see FIG. 17) so that the strips 54 are clampingly connected to—and stabilized by—the rails 51.

The strips 54 have lateral faces 55 which extend parallel to the central longitudinal plane 45 of the tube 13b. These lateral faces are each provided with a longitudinally continuous guide groove 56, both grooves extending parallel to one another. The grooves 56 accommodate bearing balls 58 on which a double-T shaped contact carriage 57 moves along the tube 13b. Carriage 57 is provided with carriers 59 located—as shown—at opposite sides of and spaced from the strips 54. Each of these carriers 59 has embedded in it an inner magnetic system made up of the earlier-mentioned magnetic bodies 60 (see also FIG. 9 in this connection). As before, the magnetic system here is an internal system and may be made up of magnetic bodies mounted at two different height levels. To avoid confusion in identification, the magnetic bodies are in FIG. 9 identified with reference numeral 60; they may be circumferentially offset relative to one another.

The carriers 59 are connected with one another by means of a traverse member 61 which, as shown, extends between the strips 54 but is spaced from the same. The traverse member 61 carries a plurality of contact fingers or sliders 62-65 which are located intermediate the carriers 59 and each face towards the respectively opposite strip 54. These fingers 62-65 slide along (in contact with) metallic resistance members 66-69 which are affixed to (e.g. rolled onto) the surfaces 70 of the strips 54. These surfaces extend lengthwise of the tube 13b and face one another, forming resistance paths which extend over the entire length of the strips 54. The return leads 71-74 of the members 66-69 are molded or otherwise directly incorporated in the strips 54, which not only protects them but makes for simple and economical manufacture.

Mounted between the members 66 and 69, and the members 67 and 68, are additional electrically conductive strips or members 75 which permit contact with a potentiometer tap to be made. These members 75 cooperate with sliding fingers (taps) 76 which are mounted at the center of the traverse member 61.

Figure 18:
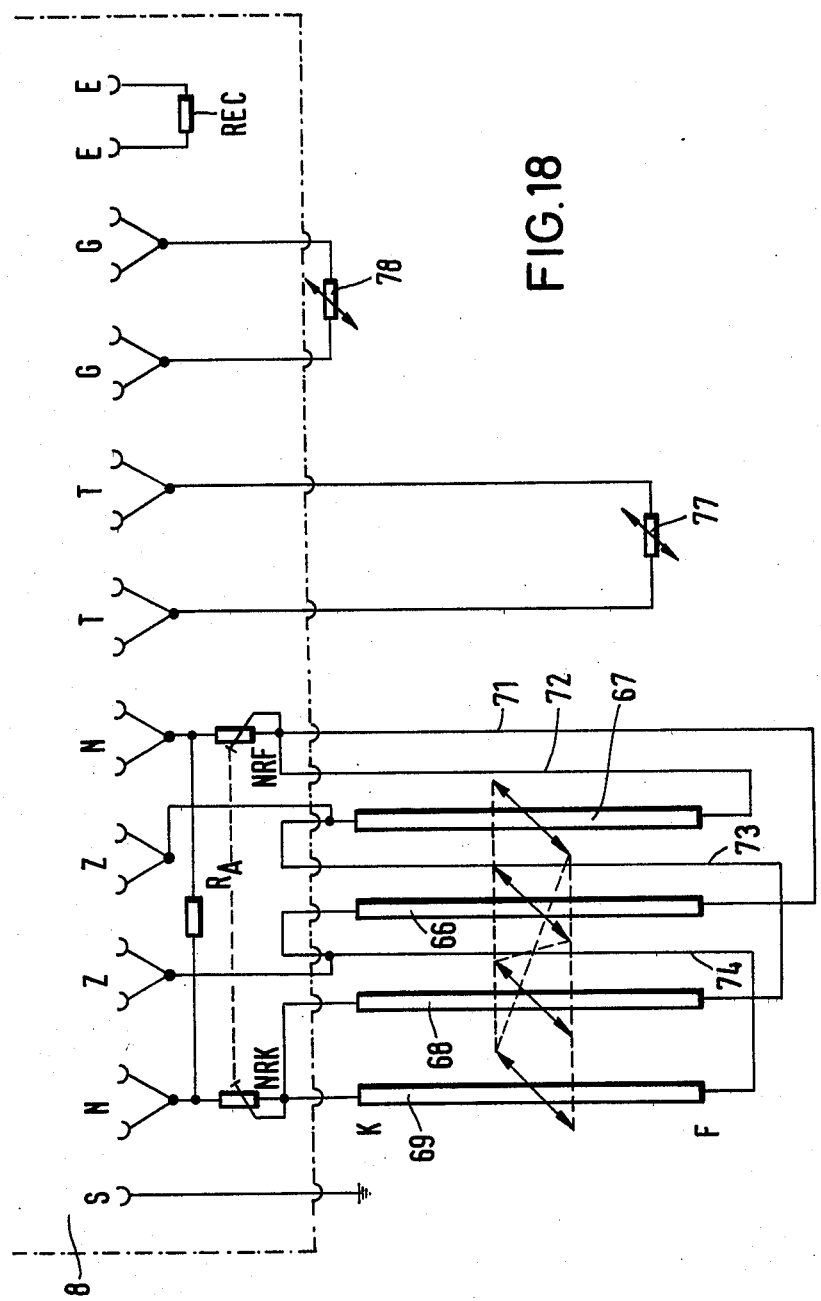
FIG. 18 is a circuit diagram showing electrical connections for a probe in accordance with an embodiment of the invention.

The fingers 62, 64 and 63, 65 of the members 66, 68 and 67, 69 which are located diametrically opposite one another with reference to the central longitudinal axis 28 of the tube 13b, are electrically coupled in cross-wise relationship with a Wheatstone bridge which is described with respect to FIG. 18.

As there shown, the Wheatstone bridge is designed to measure the liquid level in the container 1 (see FIG. 1). It is based upon a four-conductor construction and utilizes inclinometer members NRF for the initial or starting level and NRK for the final level, to achieve electrical matching to the inclination of the container 1 relative to the horizontal. Reference numeral S identifies the system shielding.

FIG. 18 shows that the head end of the member 69 is electrically connected with the contact N in head 8, via the inclinometer NRK. In the same manner, the head end of the member 68 is connected with the contact N via the inclinometer NRK. The head end of the member 66, on the other hand, is connected with the zero terminal Z which also has connected to it the bottom end of the member 69 (via return conductor 74). The head end of member 67 is connected to another zero terminal Z to which the bottom end of the member 68 is also connected (via return conductor 73). The bottom end of member 67 is connected with the corresponding N-terminal of head 8, together with the bottom end of the member 66, via the return conductors 72 and 71 and the inclinometer NRF for the initial liquid level. The two inclinometers may be coupled with one another in any suitable manner; mechanical coupling is currently preferred and known per se. The conductor sections provided on the head 8 between the inclinometers NRK and NRF on the one hand, and the terminals N of the head 8 on the other hand, are connected with one another by the illustrated conductor section $R_A$.

A temperature sensor 77 is connected with the head 8 via terminals T and furnishes data concerning the temperature of the liquid 2 contained in the container 1. A flooding protector 78 warns against the (undesired) entry of water and/or container liquid into the recess 6 in which the container dome 4 is located. The device 78, known per se, is connected to the head 8 via terminals G. And finally, the FIG. 18 circuit may be provided with a signalling device REC (known per se) which is connected to head 8 via terminals E and identifies which probe is providing the signals.

The invention will not only be seen to overcome the disadvantages of the prior art, but also to possess many advantages not to be found in the prior art. For example, the measured values can be remote-transmitted, using multiple-conductor technology to overcome the problems posed by single-conductor resistance.

Moreover, the probe according to the invention can be used with any and all containers in which a liquid level is to be monitored. This is of particular importance—although not limited to—in connection with fuel tanks installed (e.g. buried) at gasoline stations. The multiple-use possibility results from the fact that it is only necessary to push the guide tube through the tapped bore in the dome cover of the container. The float system being of the type which can be assembled by pushing it together, it can be inserted during installation of the float through the much larger-diameter opening for the filling tube of the container and, after the probe tube is inserted through the dome cover hole, the float system can then be connected to this tube. The magnetic coupling between the inner and outer magnetic systems of the probe can then automatically be achieved within the container, e.g. simply by pulling the dome tube up once to a position just below the dome opening. All of this means that removal of the dome cover is not necessary for initial probe installations, nor for retrofitting of existing containers with the novel probe and not even in the event of service or inspection.

The profiled rails arranged in the interior of the guide tube avoid the need for outer solder or weld spots or seams extending along the measuring path. This, inter alia, also eliminates any antibuoyancy effects and mechanical obstacles to the free rise and fall of the float system. The guide tube may, incidentally, be made long enough for it to have above the dome cover a sufficiently long shaft, which assures that even in the event of flooding in the recess accommodating the dome no liquid can enter the dome and contaminate the container contents. Electrical connections and/or manual manipulations can be eased, due to the fact that the upper end of the guide tube can be adjusted to the level of the operating armatures.

The mechanical stability of the guide tube can be readily determined—empirically, if necessary—as a function of the permissible bending factor in conjunction with the tube length, the transverse forces which act in operation within the container, and the magnetic systems used which are of high strength. The stability thus provided makes it possible for the inventive probe to be used even in conjunction with containers where the measuring path exceeds 3 meters, i.e. where the prior art is not usable for the reasons mentioned in the introduction hereto. Also, the use of the inventive probe makes the determination of the liquid level in a container completely independent of the liquid temperature.

The profiled rails need not be of one piece with the guide tube. However, this is an advantageous embodiment and the guide tube may then preferably be of the drawn type and be composed of anti-magnetic steel which can be both soldered and welded, at the option of the designer. If, as disclosed in connection with the embodiment in FIG. 16, there are two tubes used which are telescoped together, then the inner tube may e.g. be made of synthetic plastic material; in any case, however, it can have a wallthickness which is less than that of the outer tube, since it is the outer tube which provides the necessary protection against bending, torsional and pressure forces. In neither embodiment, however, is there any problem in connection with the necessary stability in mounting the profiled strips on the profiled guide rails.

The box-shaped inner configuration of the profiled rails leaves the illustrated and described inner channels in them, in which additional devices (such as signal-originating devices and their associated wiring etc.) can be installed.

In an embodiment such as that in FIG. 17, in which the profiled strips are provided in their lateral faces with guide grooves for the contact carriage, it is currently preferred to make the strips of glasfiber and/or a polyester material. As mentioned before, these strips are advantageously produced by extrusion, a manufacturing method which not only allows them to be manufactured in such a manner as to precisely conform to the shape of the guide and stabilizing rails, but also to produce at the time of manufacture the necessary guide grooves for the bearing balls on which the carriage moves, and to produce these grooves with such accuracy that a low-friction guidance of the carriage is assured. And, of course, it is possible to incorporate any desired additional elements—such as return wires for the resistance elements—directly into the profiled strips during the manufacture of the same.

Depending upon the manner of the electrical circuit connections the electrical terminals and the contact members may be connected at head and/or foot end by soldering or welding. The aforementioned use of bearing balls on which the contact carriage moves, is of course optional and not to be considered as absolutely necessary. Nevertheless, the use of such bearing balls has the advantage of reducing friction between the carriage and the profiled strips. The traverse member located between the profiled strips and connecting the two inner magnetic systems of the probe (see FIG. 17) is so constructed that the frictional contact of the bearing balls in the guide grooves is reduced to a minimum.

The contact members themselves may be discrete members of strip-shaped configuration, preferably a metal such as a noble metal (e.g. gold, silver or certain special steels, such as an alloy known as Ag/Pd-40/60 or an Ag/Au metal having good electrically conducting characteristics). These members need not, however, be constructed as discrete members; as briefly indicated in connection with FIG. 17 they can be rolled onto the facing surfaces of the profiled strips in form of strip-shaped layers. Especially in that form they have the advantage of extremely constant operating characteristics, such as corrosion resistance, temperature consistency, freedom from the formation of layers of other material on them, and resistance to aging. Moreover, they can be readily electrically matched and this can be done with very considerable accuracy.

The currently preferred embodiment illustrated in FIG. 17 utilizes the already illustrated and described four sensors which are mounted on the contact-carriage traverse member (the fingers) and which are electrically coupled with one another in a bridge comparison circuit; these fingers cooperate with the four electrical contact (resistance) members. In other words: what is being done here is to use a self-monitoring bridge comparison circuit and this permits a constant monitoring and error indication as indicated by bridge deviations. Non-plausible resistance differences, which may e.g. result from corrosion of the electrical contact members over prolonged periods of time or be due to material fatigue of the contact fingers which may no longer be making proper contact, are to all intents and purposes eliminated with the probe according to the invention, since electrical resistance differences are compensated within the bridge circuit without resulting in erroneous signal indications. For these reasons the embodiment using the bridge circuit is especially useful for monitoring purposes and/or a calibratable level determination and/or volume measurements. The self-monitoring feature of the bridge circuit has the further advantage that the circuit can be quite readily linked with an optical and/or acoustical indicator, with the resulting advantages. Moreover, by changing the contact pattern of the slider (finger) system the arrangement according to the invention can be retro-actively caused to conform to any special requirements of a user or potential user.

The sliding fingers are advantageously a unit with the inner magnetic system (see FIG. 17), although this is by no means a requisite.

The float system has already been described in detail. It should be mentioned, however, that the parts of the slide bearing used in mounting the float system are advantageously made of a synthetic plastic material which has a low coefficient of friction, at least with respect to the material of the tube on which it slides—and which is also chemically neutral with respect to the liquid whose level in the container is to be monitored. The same chemical neutrality should, of course, also apply to the material of the float itself. The outer magnetic system is preferably embedded in the synthetic plastic material of the slide bearing. The individual floats of the float system are connected to the slide bearing with push-type or snap-type connections which are so constructed that during manual insertion through the filling opening of the container, only small forces are required to effect the requisite connection of the floats to the slide bearing. On the other hand, however, the construction is such that for removal of the floats from the slide bearing, much greater forces are necessary (compare FIGS. 8-9) to effect such separation; this is a safety factor to avoid unintentional disengagement of the floats from the slide bearing. Any desired number of floats can theoretically be used; however, it is currently preferred to use three such floats per slide bearing, which are circumferentially offset relative to the bearing by 120° each. The parts making up the slide bearing—if the same is of more than one part—are advantageously hinged at one side and, at the opposite side, are detachably connectable by snap-type connections. The hinge and the snap-type connections are preferably so constructed that despite the intended tolerances relative to the tube on which the slide bearing is mounted, a degree of measuring accuracy can be expected and achieved which allows the desired calibration standard to be met. The float construction, incidentally, is also such that in certain circumstances—e.g. in the event of turbulence of the liquid in the container—the float system can turn freely about the tube on which it is mounted. It goes without saying that in the construction according to the present invention, no adjacent parts or armatures are contacted by the probe.

If the bearing is of the bipartite or multipartite type, i.e. with parts which are hinged together as for instance shown in FIG. 10, the spring 31 shown there is not mandatory but advantageous. In cooperation with the snap-type couplings 29, 30 it assures that the parts of the bearing properly embrace the guide tube and remain mounted thereon in their intended operative position.

Unlike prior-art probes, the probe according to the invention can—and is fully intended to—be used in containers which are pressurized. This is achieved by filling the float elements with a hard (i.e. high-density) synthetic plastic foam which is completely capable of withstanding the container pressures involved. In addition, this construction also assures high buoyancy forces and reserves due to volume displacement of even liquids having low specific gravity.

In those embodiments in which tubular sections are used as the bearing (the float system being the same as described before), the axial length of the tubular sections may, just as a rule of thumb, be about one-third of the section diameter. Of course, there is nothing compelling about this relationship. The sections themselves may be made of metallic material, such as steel, and a steel known as ST 37 has been found particularly useful for this purpose.

Figure 5:
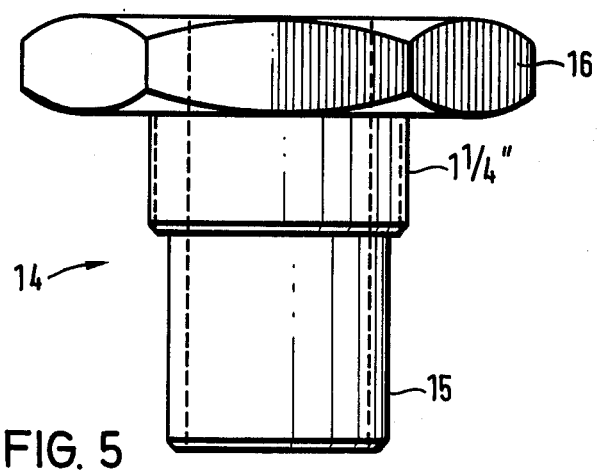
FIG. 5 is an elevational view, on an enlarged scale, of a threaded connector for use in securing the tube of FIG. 4 to a container cover.
Figure 6:
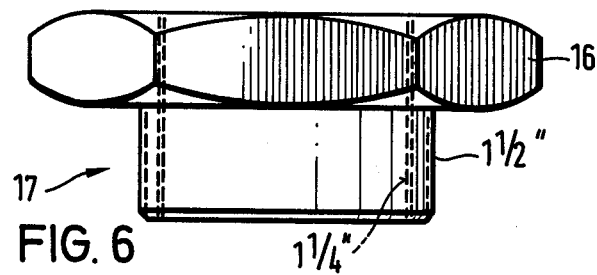
FIGS. 6 and 7 are enlarged-scale elevational views, showing box nuts for use with the connector of FIG. 5.
Figure 7:
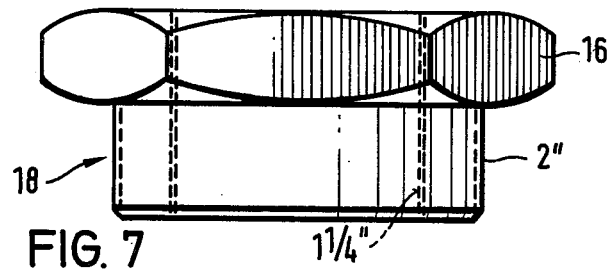

The use of a guide tube with a standard-sized threaded connector, as described and illustrated with reference to FIG. 4, and its adaptation to various different container-cover openings by means of adapter nuts such as shown in FIGS. 5-7, has the advantage that it is possible to use a guide tube from stock without having to know the actual in-situ conditions. Whatever different conditions may there prevail which cannot be handled by the stock item, can then be readily accommodated by the use of the requisite adaptor nut. In actual practice, the dome covers used on the type of container with which the probe is to be employed, have almost exclusively a threaded opening of 1.25, 1.5 or 2" inner diameter. This means that the standard tube-and-connector arrangement proposed herein, together with the two proposed adaptor nut sizes, in effect is able to take care of all installation requirements which are likely to occur in practical use.

As already indicated earlier, e.g. in the description of FIGS. 17 and 18, it is advantageous for the probe to be provided with a connecting or terminal head incorporating an electrical correcting device which senses container (and content) inclination manually or electrically. The correction device is preferably part of an explosion-protected terminal box having an integrated circuit board. The box is provided with terminals for the electrical cables and may be locked against unauthorized tampering by means of crossed-slot screws requiring a special screw-driver for their operation.

If an integrated circuit board is indeed used, then it is advantageous if it includes continuously adjustable inclinometers, e.g. in form of potentiometers and a terminal resistor. The inclinometers are preferably mechanically coupled and, in the event the container is inclined or moves to an inclined position, they effect any correction that may become necessary as a result of this. Moreover, with such a construction it is also possible to obtain a parallel shift of the measured-value ranges about the zero-point center of the filling curve. This is sufficiently large to take into account even the practical (i.e. actual) values of such containers which, over a prolonged time of use, have "settled" in the ground. The inclinometers are especially useful where it is desired to avoid having to re-calibrate the container volumetric content by comparison with existing dipstick calibration.

The inclinometers for the "head" level adjustment and for the "foot" level adjustment are located in the connecting or terminal head. The terminal resistor is intended, in connection with the conductive capacity, to assure that the inventive probe is high-frequency safe, which is to say that the conductor lengths used in actual practice often act as antennae and, in such cases, may be the cause of incorrect measurements. However, it should be understood that the invention also makes it possible to replace the inclinometers with fixed-value resistors which can then be set stagewise by means of appropriate switches.

The indication and operation unit of the probe, which may be provided at the terminal head thereof, may be powered by batteries and/or solar cells, i.e without requiring the supply of electrical energy via electrical cables or other conductors. The values measured by the probe may be stored in a microprocessor (known per se) and, when required, can be read out manually or automatically by remote contral by authorized personnel.

The probe according to the present invention is thus especially useful in keeping track of repeated liquid additions during regular container fillings (and, at that, of calibratably repeatable additions), so that only those quantities of liquid (e.g. fuel) are volumetrically measured by the probe which are actually filled into and remain in the container.

If the probe is constructed as a passive unit, an external control device will be provided to perform the aforementioned signalling functions.

It goes without saying that the probe can be constructed so as to be explosion-protected.

It is also advantageous if the probe is provided with a temperature-sensor which is preferably located in the guide tube within the (Ex) 0 zone; it may be hard-soldered to the tube periphery and ground to the shape thereof. The sensor may be located in one of the channels formed by the guide rails and be located within the zero zone, preferably within the lower seventh of the diameter of the particular container. Various temperature sensors may evidently be used; a type known as PT-100 mounted in a metallo-ceramic housing and using multi-conductor construction, has been found to be especially suitable. The sensor may also be of such construction (known per se) that it acts as a signal-furnishing device for a liquid-level threshold value. If the sensor is indeed of this type, or if separate liquid-level threshold signalling devices are associated with the guide tube, then these latter are also inserted into the guide tube and secured thereto by hard-soldering, so as to conform to the periphery of the tube by grinding to the desired shape. Such separate devices are preferably PTC/NTC resistors in metallo-ceramic housings.

The tube may also be provided with a liquid-protector (especially a water protector) which should be located within the so-called explosition zone 1, i.e. in the ground recess in which the container dome is located and accessible, preferably immediately above the dome cover. The purpose of this device, which may be mounted directly on the guide tube, is to warn against flooding of the dome-containing recess by water and/or liquid container contents, such as fuel. The device can, however, also be mounted in the guide tube, being hard-soldered therein and ground to conform it to the tube periphery.

Finally, it should be mentioned that none of the electrical devices associated with the probe according to the invention have electrical contact with the guide tube or the container potential of a possible employed cathodic corrosion-protection device (known per se) at any time.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the inventive contribution to the art. Therefore, such adaptations should—and indeed are intended to—be comprehended within the meaning and scope of equivalence of the appended claims.

I claim:

1. A test instrument, particularly a probe for monitoring the level of liquid in a container having a cover provided with a tapped hole, comprising a guide tube threadedly securable in said hole and having a portion within the container; a float system in the container; a magnetic indicating system for the level of said float system; an electrical contact carriage guided on said portion of said tube; two sets of profiled guide rails spaced from each other and extending lengthwise in said tube parallel to each other, said sets of guide rails being disposed diametrically opposite each other and being parallel to a central longitudinal plane of said guide tube; a profiled electrically non-conductive strip push-mounted on each of said sets of guide rails and extending lengthwise thereof, said strips having lateral faces provided with guides for said carriage; and a plurality of electrically conductive resistance members extending lengthwise and forming integral parts of each of said profiled strips.

2. An instrument as defined in claim 1, wherein said magnetic indicating system includes an inner magnetic system on said carriage and an outer magnetic system surrounding said inner system and provided on said float system, said carriage including a traverse member extending into the space between said profiled strips and touching contacts on said resistance members.

3. An instrument as defined in claim 2, wherein said magnetic indicating system constitutes a means for indirectly coupling said carriage with said float system.

4. An instrument as defined in claim 1, wherein said guide rails are integral with said guide tube.

5. An instrument as defined in claim 1, wherein said guide tube has an outer tube element and an inner tube element telescoped into said outer tube element, said guide rails being integral with said inner tube element.

6. An instrument as defined in claim 1, wherein said guide rails of each set together define an elongated channel of polygonal cross-section.

7. An instrument as defined in claim 6, wherein said cross-section is substantially quadratic.

8. An instrument as defined in claim 6, wherein the guide rails of each set have longitudinally extending mounting ribs which face towards one another from opposite sides of said plane.

9. An instrument as defined in claim 6, wherein the guide rails of each set have longitudinally extending mounting ribs which face away from each other and from said plane at opposite sides of the latter.

10. An instrument as defined in claim 1, wherein said profiled strips are extruded and have lateral faces formed with guide grooves for said carriage.

11. An instrument as defined in claim 1, wherein said profiled strips have facing longitudinally extending surfaces and said resistance members are metal strips in form of tracks affixed to said facing surfaces by rolling the tracks thereonto.

12. An instrument as defined in claim 11, wherein the metal of said tracks is a noble metal.

13. An instrument as defined in claim 11, wherein said tracks include two spaced tracks per profiled strip and each of said profiled strips further includes a low-ohmic rolled-on metallic signal-tapping strip located between said spaced tracks of the respective strip.

14. An instrument as defined in claim 1, wherein said resistance members have an electrical function which, due to electrical matching, conforms to the container filling curve.

15. An instrument as defined in claim 1, wherein said resistance members have return wires which are embedded in said profiled strips.

16. An instrument as defined in claim 2, wherein said resistance members include four metallic tracks, and said traverse member include four sliding contact fingers in engagement with the respective tracks and coupled crosswise with one another via a bridge-type comparison circuit.

17. An instrument as defined in claim 1, wherein said float system includes a bipartite bearing mounting on outer magnetic system which forms part of said indicating system, a plurality of floats, and means for snap-coupling said floats to said bearing.

18. An instrument as defined in claim 17, wherein said bearing has its two parts hingedly connected to one another at one circumferential location of said guide tube and said bearing further comprises snap couplings for said parts at another circumferential location of said guide tube.

19. An instrument as defined in claim 18, further comprising at least one spring for urging the parts of said bearing to coupled position.

20. An instrument as defined in claim 17, further comprising a contact spring provided on one of the components including said tube and said bearing and being in electrical contact with the other of said components.

21. An instrument as defined in claim 1, wherein said magnetic indicating system comprises an outer magnetic system including a plurality of magnetic bodies mounted on said float system, said float system having a tubular section and said magnetic bodies being installed within said tubular section.

22. An instrument as defined in claim 21, wherein said tubular section is of circular cross-sectional configuration.

23. An instrument as defined in claim 21, wherein said section is of polygonal cross-sectional configuration.

24. An instrument as defined in claim 21, wherein said tubular section has circumferentially distributed openings and said float system comprises a plurality of individual floats of pressure-resistant synthetic plastic material filled with high-density foam, and means for coupling each of said floats to said section, said coupling means extending into said openings.

25. An instrument as defined in claim 1, wherein said tube has a connector provided with a 1.25 inch external thread for connection to said cover, and further including a plurality of cap nuts each having an inner thread for mating with said external thread and an external thread, each of said cap nuts having a different external thread.

26. An instrument as defined in claim 1 further comprising a connecting head associated with said guide tube and including indicator means for manually or electrically indicating out-of-horizontal positions of said container and of the liquid level therein.

27. An instrument as defined in claim 26, further comprising an explosion-protected connector head having an integrated circuit board, said indicating means being at least in part a component of said head.

28. An instrument as defined in claim 26, wherein said head includes an indicating and probe-operating unit.

29. An instrument as defined in claim 28, wherein said unit includes a micro-processor provided with requisite storage capacity.

30. An instrument as defined in claim 1, further comprising a temperature sensor associated with said tube for sensing the temperature of liquid in said container.

31. An instrument as defined in claim 1, further comprising a liquid-level threshold detector associated with said tube.

32. An instrument as defined in claim 1, further comprising a flooding detector associated with said tube.

33. An instrument as defined in claim 1, further comprising a probe-identifying device for identifying the probe from which signals originate.

* * * * *